(12) United States Patent
Gradert et al.

(10) Patent No.: US 9,701,389 B2
(45) Date of Patent: Jul. 11, 2017

(54) METHOD FOR COATING A SURFACE OF AN AIRCRAFT AND AN AIRCRAFT COATED THROUGH THIS METHOD

(71) Applicant: Airbus Operations GmbH, Hamburg (DE)

(72) Inventors: Isabell Gradert, Bremen (DE); Nicole Jordan, Kirchlinteln (DE); Ottmar Schramm, Drangstedt (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 414 days.

(21) Appl. No.: 14/198,132

(22) Filed: Mar. 5, 2014

(65) Prior Publication Data

US 2014/0255632 A1 Sep. 11, 2014

Related U.S. Application Data

(60) Provisional application No. 61/772,571, filed on Mar. 5, 2013.

(30) Foreign Application Priority Data

Mar. 5, 2013 (DE) .................. 10 2013 102 164

(51) Int. Cl.
*B64C 1/00* (2006.01)
*B32B 1/08* (2006.01)
(Continued)

(52) U.S. Cl.
CPC .............. *B64C 1/00* (2013.01); *B29C 63/38* (2013.01); *B32B 1/08* (2013.01); *B32B 3/26* (2013.01);
(Continued)

(58) Field of Classification Search
CPC ..................................................... B29C 63/38
(Continued)

(56) References Cited

U.S. PATENT DOCUMENTS

| 4,024,002 A | 5/1977 | Lott |
| 5,435,865 A | 7/1995 | Lee et al. |
| 2010/0316853 A1 | 12/2010 | Kuhlenschmidt et al. |

FOREIGN PATENT DOCUMENTS

| DE | 8217987 U1 | 9/1982 |
| DE | 3222039 A1 | 1/1983 |

(Continued)

OTHER PUBLICATIONS

German Patent and Trademark Office, German Search Report for Application No. 102013102164.6, mailed Dec. 2, 2013.

*Primary Examiner* — Brent O'Hern
(74) *Attorney, Agent, or Firm* — Lorenz & Kopf, LLP

(57) ABSTRACT

A method for coating a surface of an aircraft is provided. The method comprises the steps of cutting to size at least one film section from a shrinkable film material in such a manner that the film section relative to a surface section of the aircraft, which surface section is to be coated with the film section, comprises an overmeasure that is determined by the degree of shrinkage of the film material; applying the film section and a functional coating to the surface section so that the functional coating is arranged between the surface section and the film section; and shrinking the film section by heating it to a temperature that corresponds at least to the shrinkage temperature of the film section and at least to the flow temperature of the functional coating until the contours of the film section largely conform to the contours of the surface section.

11 Claims, 3 Drawing Sheets

(51) Int. Cl.
  *B32B 3/26* (2006.01)
  *B29C 63/38* (2006.01)
  *B29L 31/30* (2006.01)

(52) U.S. Cl.
  CPC .. *B29L 2031/3076* (2013.01); *Y10T 428/1328* (2015.01); *Y10T 428/24628* (2015.01)

(58) Field of Classification Search
  USPC .......................................................... 156/85
  See application file for complete search history.

(56) References Cited

FOREIGN PATENT DOCUMENTS

DE   102004044655 B4   6/2006
GB         2100996 B  *  7/1985   ........... A63H 27/001

* cited by examiner

METHOD FOR COATING A SURFACE OF AN AIRCRAFT AND AN AIRCRAFT COATED THROUGH THIS METHOD

CROSS-REFERENCE TO RELATED APPLICATIONS

This application claims priority to German Patent Application No. 10 2013 102 164.6, filed Mar. 5, 2013 and to U.S. Provisional Patent Application No. 61/772,571, filed Mar. 5, 2013, which are each incorporated herein by reference in their entirety.

TECHNICAL FIELD

The technical field relates to a method for coating a surface of an aircraft and to an aircraft coated by means of this method.

BACKGROUND

The coating of external surfaces of aircraft is a lengthy, expensive process that is often not automated and that is frequently accompanied by special requests from the aircraft operator. It is common practice to place scaffolding around the aircraft, and from the scaffolding to manually paint the relevant surfaces with the use of paint application devices. Subsequently, complete drying is necessary. No other work can be carried out on the aircraft until drying is complete and the scaffolding has been largely removed from the aircraft. Furthermore, devices for area-by-area painting of pre-treated surfaces of an aircraft are known.

DE 10 2004 044 655 B4 shows a device for painting curved surfaces of an aircraft, which device comprises a guidance device and a paint output device guided thereon.

Furthermore, DE 10 2009 021 610A1 discloses an aircraft comprising a painted surface on which at least one decorative plastic film, which differs in color from said painted surface, has been applied by bonding, which film for the purpose of providing erosion protection is covered by a coating of clear lacquer comprising a UV filter.

In addition, other objects, desirable features and characteristics will become apparent from the subsequent summary and detailed description, and the appended claims, taken in conjunction with the accompanying drawings and this background.

SUMMARY

In order to increase the speed of manufacturing an aircraft and to reduce the time during which the aircraft is blocked for other tasks, it might be advantageous to accelerate the process of coating a surface of an aircraft and/or to largely automate it, wherein nevertheless flexibility in terms of expected special requests made by the aircraft operators needs to be ensured.

According to various teachings of the present disclosure, a method for coating a surface of an aircraft and an aircraft coated by means of this method are provided, which method leads to significant acceleration of the process of coating the aircraft while being just as flexible as is the manual application of paint, and which method does not result in increased weight of the coated aircraft.

In one embodiment, provided is a method for coating a surface of an aircraft, with the method comprising cutting to size at least one film section from a shrinkable film material in such a manner that the film section relative to a surface section of the aircraft, which surface section is to be coated with the film section, comprises an overmeasure that is determined by the degree of shrinkage of the film material; applying the film section and a functional layer to the surface section so that the functional coating is arranged between the surface section and the film section; shrinking the film section by heating it to a temperature that corresponds at least to the shrinkage temperature of the film section and at least to the flow temperature of the functional coating until the contours of the film section conform to the contours of the surface section.

In other words, a method for partially or completely coating a surface of an aircraft by means of a film is provided, which film has been cut to size from a shrinkable film material. This allows for simple application to the surface concerned and for the subsequent shrinkage as a result of the effect of heat. Below, it is set out that the surface of an aircraft is coatable by means of one or several such film sections, wherein it is also possible to use several film sections arranged side by side in order to coat a surface comprising several surface sections. Edge regions of film sections arranged side by side may be arranged so as to overlap. It is also possible to implement multi-layer film coatings; this comprises, in particular, the simultaneous or consecutive application of several films that rest one on top of the other.

The surface quality of the structure to be coated with the film should support unproblematic adhesion of the film so that for this purpose the surface quality of the structure should be correspondingly set by the production method or by corresponding after treatment. However, small height differences in the structure are easily compensated for by the film.

A surface section that is to be coated with the use of a film section comprises a designated contour that is to be matched to the external contour of the film section. Cutting to size from a sheet-like or tubular shrinkable film material takes place in such a manner that the surface area of the film section is larger by a degree of shrinkage than the surface area of the surface section, wherein in this arrangement the contours of the film section correlate to the contours of the surface section. As a result of the heat-induced shrinkage the film contracts so that its surface area and the extent of the contours decrease in order to subsequently largely attain agreement between the size and extent of the film section with the size and extent of the surface section. The degree of shrinkage is typical for the selected film material so that with a corresponding selection of the film material the degree of shrinkage results. In one example, in the case of films comprising a decal, the smallest possible shrinkage may be desirable in order to simplify placement of decals. Consequently it may make sense to select a film material that during heating tends to little shrinkage, for example ranging from about 1 to about 10%. Of course, it is also possible to use film materials comprising a significantly greater degree of shrinkage, which may be up to about 80% or more. In one example, areas that are to be coated with monochrome films, which areas have a complex spatial shape, are more easily coatable in the case of a greater degree of shrinkage because the film that has not yet been shrunk is easier to place onto or over the surface concerned, and by means of shrinkage is able to compensate even larger gaps in the surface.

The degree of shrinkage may be influenced in a targeted manner by adapting the material's characteristics. This results above all in the ability, by means of geometric data relating to the surface section to be coated, in one example, by way of digital methods, to determine the exact necessary contour of the film section prior to its shrinkage, which contour may furthermore be cut from the film material by means of an automated process of cutting to size. It may be advantageous, during the process of cutting to size, to apply check mark elements to the film section, which check mark elements allow precise alignment of the film section on the surface section. For example, check mark stickers could be placed on the external surface, which check mark stickers during application could be made to be flush with predetermined characteristics of the surface section. Applying the film section means that the film section is precisely arranged on the surface section so that prior to initiating shrinkage there is correct placement in terms of the final coating.

The functional coating is made from a functional coating material that prior to initiation of the shrinkage process allows loose adhesion of the film section on the corresponding surface section. In this arrangement the intensity and effect of adhesion should be reversible and should only be such that easy peeling off and repeated adhesion is possible for proper alignment. At the same time the functional coating is designed in such a manner that when it reaches a flow temperature its flowability is such that during initiation of the shrinkage process on the surface section the film section may flow or glide on the functional layer. Because of the adhesive effect of the functional layer it may make sense to apply a peel-off protective layer to the functional layer, which peel-off layer adheres only slightly to the functional layer. Consequently, the tensions within the film section may equalize over the entire film section, and furthermore it is possible for material to flow from regions of the film section with less shrinkage to regions with greater shrinkage. Subsequently this results in a homogeneous smooth and evenly dense surface that provides complete flush-mounted coating of the corresponding surface section and that is free of creases. Applying film over indentations or gaps between individual structural elements by means of a film section that stretches over them may take place with the use of a squeegee, a spatula or some other element that applies point-like forces or linear forces, wherein splitting open the film at these locations makes it possible to implement a sharp contour.

The overall work time necessary to be used directly on the aircraft for the coating to be carried out, during which time the aircraft is blocked for other work, is significantly below the normal expenditure of time required for manual coating processes. The necessary preparatory work for producing the shapes of film may be transferred to other external facilities.

In one embodiment cutting to size involves cutting a contour from a sheet-like film material. In this arrangement the film section may easily be cut to size on a suitable cutting table and may subsequently, for example rolled up, be taken to the aircraft. Planar surfaces or surfaces that are essentially curved only in a single axis may be particularly easily coated by means of such sheet-like film sections.

Cutting to size may, furthermore, involve connecting at least two edges of the film material for closing the circumference of the film section to be cut to size along at least one line of extension. In this manner a hood-type or tubular film section is produced that is particularly suited for coating complex surface sections and/or surface sections that may easily be spatially encompassed, enveloped or encased. The above may include control unit surfaces or wing surfaces.

Cutting to size may, furthermore, also involve cutting a contour from an at least in some regions tubular film material so that a separately established connection between two edges is not required. This variant is advantageous in one example, in the case of relatively high degrees of shrinkage, in order to design the tubular source material as simply as possible, in other words with a constant diameter.

In one embodiment cutting to size involves connecting several planar or spatially-shaped film subsections, wherein these film subsections may be sheet-like and circumferentially closed. Planar or tubular film subsections may be connected with spatially curved film subsections so that, practically, film sections of any complexity may be made that may also coat surface sections of correspondingly complex shapes.

In one embodiment the step of heating involves the gradual local heating of the surface of the film section. By means of locally heating the film section it is possible for the checking of the shrinkage behavior to take place manually, and consequently, in one example, during placement of decals, strong flowing from a region of the film section, which region comprises the decal, to outer film sections is avoided.

In this arrangement it may make sense to place the film section in such a manner that a decal located thereon is placed on the surface section at a position provided for this, and the step of heating starts at a region of the film section, which region comprises the decal. Heating the decal may correspondingly take place at first in order to achieve targeted shrinkage in adhesive surroundings of the heated region.

As an alternative, heating may also take place first in a region situated outside the decal, and consequently a functional coating that achieves initial adhesion to the surface of the aircraft becomes flowable only at the end in order to support complete smoothing and compensation for film tension.

In one embodiment heating takes place by means of a heating device that may be moved along the surface section. This may be implemented by means of a gantry system mounted beside the aircraft, or by means of a facility that may be moved directly on the surface section.

In one example, in the case of components that are coated by means of a large film section that does not comprise any decal, the step of heating involves the uniform heating of the entire area of the film section. This could take place by means of an arrangement of hot-air fans, infrared lamps or similar devices that allow large-area heating. This makes it possible to particularly quickly shrink the film onto the surface section to be coated.

It is advantageous if applying a film section involves overlapping, at least in some regions, a film section shrunk onto the surface section. In this manner the formation of gaps between individual film sections is avoided, through which gaps humidity could find its way to the fuselage structure. In one example, film sections could comprise a reduced film thickness at their regions in close proximity to the edge when compared to the film thickness in regions away from the edge, so that as uniform a thickness as possible is achieved over the entire surface of the aircraft. Furthermore, the use of film material that at shrinkage temperature in a region of overlap carries out at least partial welding is advantageous.

Applying a film section may furthermore also involve the complete overlapping of a film section shrunk onto the surface section. Such a multi-layer film system may reliably prevent any gaps on the surface, for example, if an offset is provided between the abutting positions of adjacent film sections of two layers arranged one on top of the other.

In one embodiment the method according to the present disclosure may also comprise the step of removing film by means of a microwave coupling process in order to remove damaged film sections and replace them with new film sections, or in order to make it possible to quickly change the appearance or the decal of the aircraft.

In one embodiment the film section comprises a tubular or a hood-type design, at least in one section, and the application of the film section involves placing the at least one tubular or hood-type region of the film section on at least one projecting component of the aircraft. In one example, the projecting component of the aircraft may be selected from a group of components, which group comprises the: vertical stabilizer unit, horizontal stabilizer units, wings, control surfaces, engine pylons, engine shrouds, and fairings.

Coating the surface of the aircraft may be implemented by means of a system for coating the surface of an aircraft, wherein this system in the manner of a kit comprises at least one film section made of a shrinkable film material for coating at least one surface section, wherein the at least one film section comprises overmeasure, relative to the respective surface section to be coated, which overmeasure is determined by the degree of shrinkage of the film material; a functional coating material which when heated at least to flow temperature becomes flowable; and at least one heat source for heating the at least one film section to a temperature that corresponds at least to the shrinkage temperature of the film material and to the flow temperature of the functional coating material. In this arrangement it is immaterial whether the functional coating material is already arranged on a surface section to be coated or on a film section, or whether said functional coating material is only applied to the particular surface section or film section when the above-mentioned process is implemented. During heating to at least the flow temperature, the functional coating material becomes flowable and prior to heating may achieve an adhesive effect on a surface to be coated. The at least one heat source may be a movable heating device that comprises, for example, a gantry system mounted beside the aircraft, or a heat source that is directly movable on a surface section. For example hot air fans, infrared lamps or similar devices could be used that allow local or large-area heating.

In one embodiment the at least one film section comprises a top and a bottom, wherein the bottom comprises a functional coating made from the functional coating material.

In one embodiment the at least one film section comprises a sheet-like shape. This makes sense in particular when the surface section is located at a position in which applying a film with a closed circumference is not possible or when a pronounced spherical shape is involved. The film section is thus placed on the surface section and adheres to the aforesaid and after heating up conforms to the aforesaid so as to be flush. During heating, the distribution of the film material may be supported with the use of a squeegee.

In one embodiment the at least one film section comprises a tubular shape with a closed circumference along a line of extension. The cross section of the film may vary along the line of extension; it does not necessarily have to be constant. As a result of the closed circumference the film section may conform to the surface section particularly well because tensile forces in the circumferential direction result in particularly uniform conformity of the film section to the surface section, and draw any creases from the film material across the entire circumference.

In one embodiment the at least one film section is closed at one end of the line of extension. Consequently, the film section comprises a hood shape and may be placed on a projecting surface section of an aircraft so that as a result of subsequent heating the entire surface section is coated with the film. In this case, in one example, a protrusion or seam could be arranged on the open end of the film section so that overlapping with adjacent film sections becomes possible.

In one embodiment the functional coating is an adhesive coating that is designed at a flow temperature to slide on the surface section. This could, for example, be implemented by an elastomer, for example polyethylene, polypropylene or polyolefins that soften under the effect of heat and that ultimately essentially lose their adhesive characteristics.

In one embodiment at least one circumferentially closed film section in some regions on at least one external contour is less thick than on surface regions situated on the interior. The positions of reduced thickness allow greater shrinkage so that material generally flows to this position. In this manner particularly good alignment on sheet-like bodies, which are to be completely encased, with clear outer edges may be implemented.

In one example, the film material is adapted in such a manner that on the outwards-directed surface of the film material various desired characteristics are achieved. Apart from UV-resistance for protection against brittleness of the film and easy cleanability, these characteristics may also include adequate erosion resistance and resistance to lightning strike. The latter could involve the insertion or application of a conductive material. Furthermore, the film material should protect the underlying fuselage of the aircraft against external influences in such a manner that corrosion is largely prevented. In addition, the integration of strain gauges as sensors for a structural-health monitoring system directly on or in the film is imaginable. For coating elements that comprise a variable shape that is subject to change, otherwise known as morphing structures, adequate and permanently available flexibility of the film material is desirable. These additional functions may be achieved by the targeted setting of a mixing ratio of suitable plastics, by the application of additives and/or by coating the film with suitable materials.

In one embodiment the outside of a film section comprises a riblet structure with several indentations or elevations that are arranged parallel to each other. In this manner the aerodynamic resistance or drag of the aircraft may be reduced. Applying the riblet structure may be implemented in various ways, be it by the application and curing of a coating material suited to this purpose, or by engraving or impressing grooves, as a result of which individual riblet-like webs remain on the surface.

The various teachings of the present disclosure also provide an aircraft comprising at least one surface section onto which at least one film section with a functional coating situated in between has been shrunk so that the contours of the film section rest against the contours of the surface section.

In one embodiment the at least one film section is of a tubular or a hood-like design at least in one region, by means of which said film section has been placed onto at least one projecting component of the aircraft. As an alternative or in addition the at least one film section may also comprise a sheet-like film material at least in one region. The surface coating produced in this manner may furthermore be designed according to any of the above-mentioned characteristics or methods.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 1A shows a film section after having been cut to size with an expansion and a surface area that exceeds an expansion and a surface area of the surface section to be coated.

FIG. 1B shows an application of heat to the film section of FIG. 1A.

FIG. 2A shows a film section for the further surface section.

FIG. 2B shows an application of heat to the film section of FIG. 2A.

FIG. 2C shows a removal of a portion of the film section.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
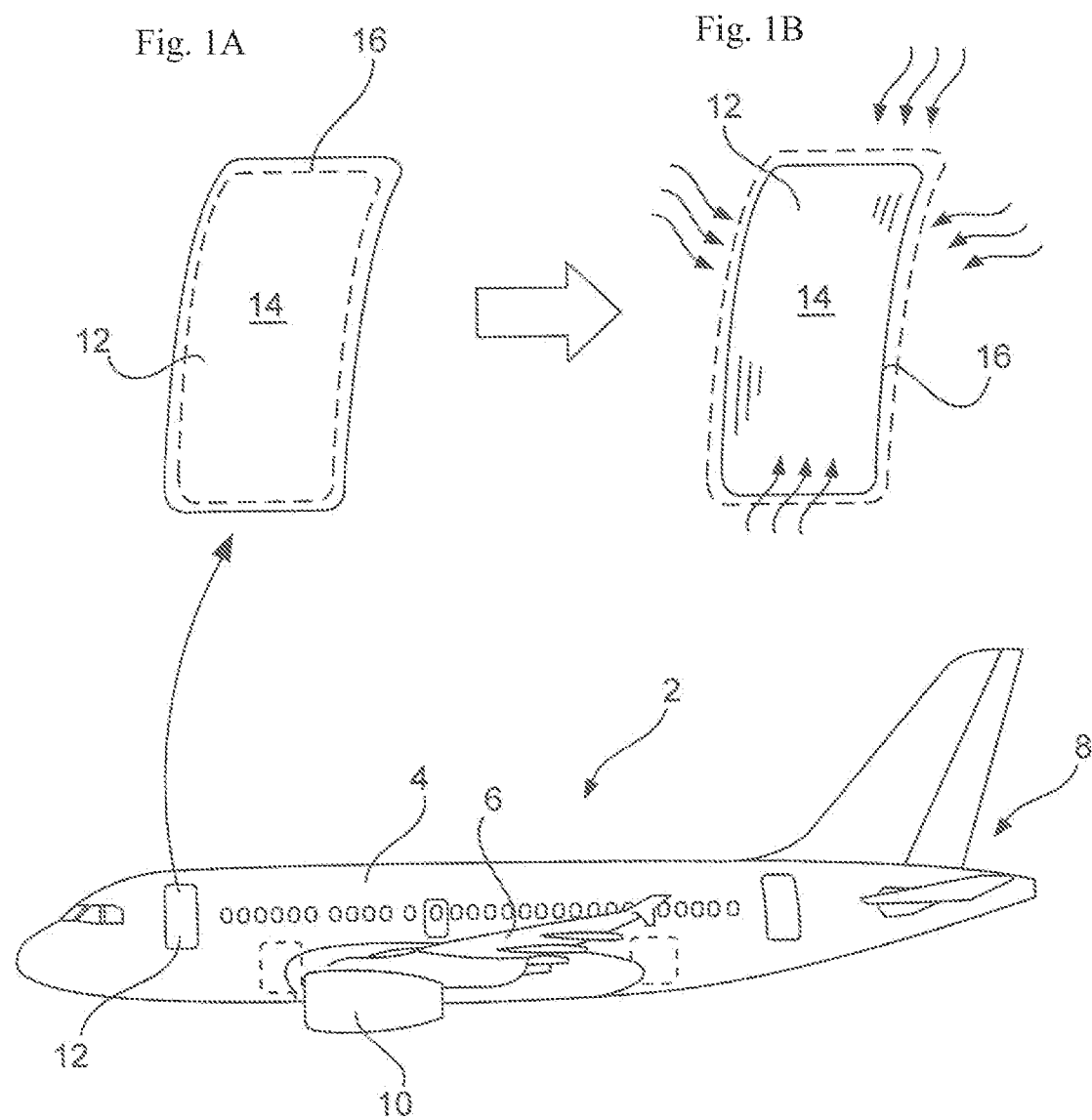
FIG. 1 shows a lateral view of an aircraft with a surface section, provided as an example, that is to be coated.

FIG. 1 shows an aircraft 2 with a fuselage 4, a pair of wing halves 6, a tail unit arrangement 8 and engines 10, which together comprise a surface to be coated. As an example, first the coating of a front door 12 by means of a film is explained.

In order to coat a surface section 14 of the door 12 with a film, first a film section 16 is cut to size. This may be achieved by way of a digitally controlled multi-axis cutting device that is in possession of data relating to the surface of the door 12 and that knows the degree of shrinkage of the film section 16. As is shown in FIG. 1A, the film section 16 after having been cut to size finally has an expansion and a surface area that depending on the degree of shrinkage exceed the expansion and the surface area of the surface section 14. It should be noted that in the diagram the surface section 14 extends to the dashed line representing the door 12.

By means of a functional coating (not shown in FIG. 1A) the film section 16 is first tacked to the surface section 14, wherein the term "tacked or tacking" refers to reversible loose adhesion with a relatively slight adhesive force. Tacking allows manual readjustment of the position of the film section 16. By the subsequent action of heating, which action is shown FIG. 1B, the film section 16 shrinks, and consequently the expansion and the surface area of the film section 16 largely correspond to the expansion and the surface area of the surface section 14. Thereafter the door 12 is coated with the film, thus comprising an extremely homogeneous, smooth coating that is free of any tension and creases.

In this arrangement the functional layer or adhesive layer is selected in such a manner that under the effect of a temperature, flowability is achieved so that a material that is in connection with the aforesaid may slide without hindrance on the surface section 14, and consequently film material may flow to regions to be shrunk. In one example, the functional coating is designed so that during heating up, once flowability has been reached and under the further effect of heat, hardening or curing takes place. After the final position has been reached, the film section 16 may thus adhere to the surface section 14.

The illustration with reference to the door 12 is to be interpreted as an example, and all the further surfaces of the aircraft 2 may be coated in a similar manner by means of a film.

Figure 2:
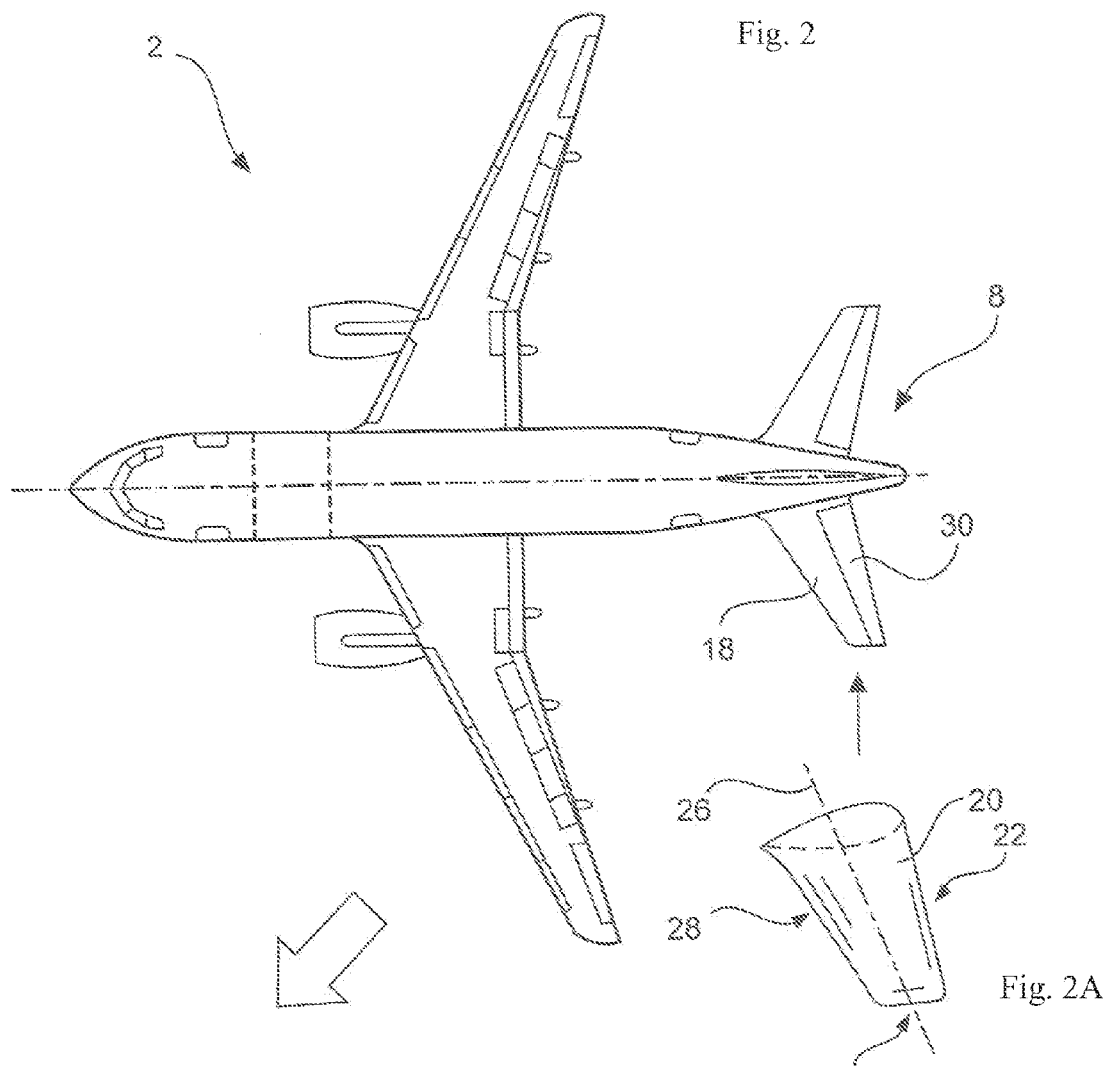
FIG. 2 shows a top view of an aircraft with a further surface section that is to be coated.

FIG. 2 shows a top view of the same aircraft 2; as an example the coating of the left-hand horizontal stabilizer unit 18 by means of a film section 20 is explained.

The film section 20 is cut to size from a sheet-like film material and is at least on one edge 24 welded together in such a manner that a circumferentially-closed tubular tapering shape with a line of extension 26 and only one opening for sliding onto the horizontal stabilizer unit 18 results, as shown in FIG. 2A. Generally, there is no welding on at least the outer edge 28 facing the direction of flow, because at this position there is a more pronounced curvature of the horizontal stabilizer unit 18 when compared to that side of the horizontal stabilizer unit 18 corresponding to the outer edge 22. In one example, the outer edge 22 also does not comprise any welding so that in that location the surface is continuous and any development of an edge or a noticeable projection is counteracted. The film material could, for example, be obtained by extruding or by means of a blow-on process. In a corresponding production process, in which a sheet-like film material is drawn in a three-dimensional shape, furthermore it is largely possible to do without a weld seam on the edge 24.

After corresponding cutting to size and applying the film section 20 to the elevator 18, heating takes place, as shown in FIG. 2B, and consequently the film section 20 is shrunk and continuously approximates the contours of the horizontal stabilizer unit 18. The initial alignment of the film section 20 may be favored in that on the edges 28 and 22 the film material is relatively thin when compared to the area situated in between. Consequently, in said position the film material undergoes stronger shrinkage so that these film regions draw themselves more strongly against the boundary edges of the horizontal stabilizer unit 18.

Since the horizontal stabilizer unit 18 also comprises a pivotable elevator 30, the latter should be cut out in a step indicated in FIG. 2C. Furthermore, it may make sense, in the case of circumferentially closed components, to carry out component-by-component coating, sometimes even prior to mounting to the aircraft 2, and consequently the components are already fully coated at the time of integration in the aircraft 2.

Figure 3:
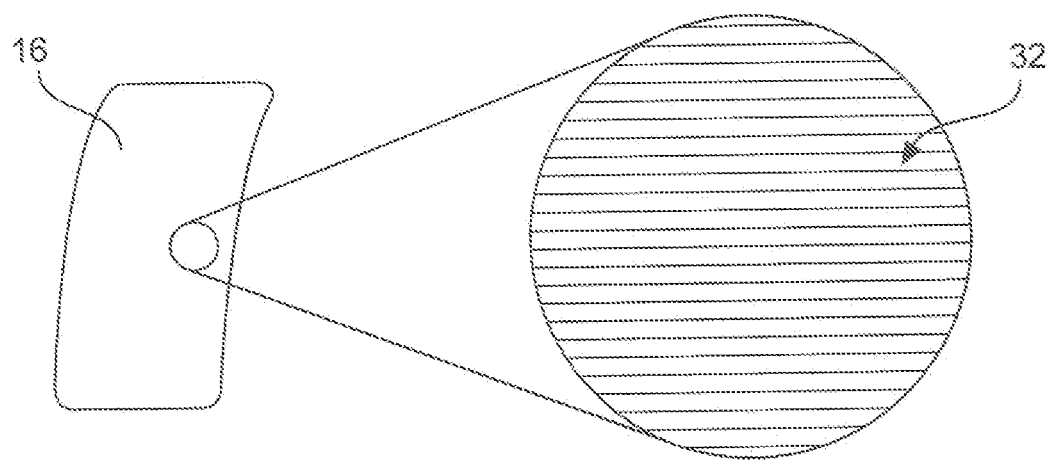
FIG. 3 shows a section of a coated surface section with riblets.

Apart from the neat, continuously coated and uniform surface provided, the method according to the present disclosure provides a special advantage in that the texture of the film material may be selected at will, and, in order to produce the texture, the material of the aircraft fuselage does not have to be treated. As shown in FIG. 3 of the surface section 16, the outwards-directed surface of a film may comprise a so-called riblet structure 32 that is adapted to the occurring dynamic flow in flight. In this manner a significant reduction of the aerodynamic resistance or drag may be achieved. By adapting the film material it is furthermore possible to achieve a corresponding abrasion resistance, which thus very considerably slows down the erosion of the riblet structure 32.

Figure 4:
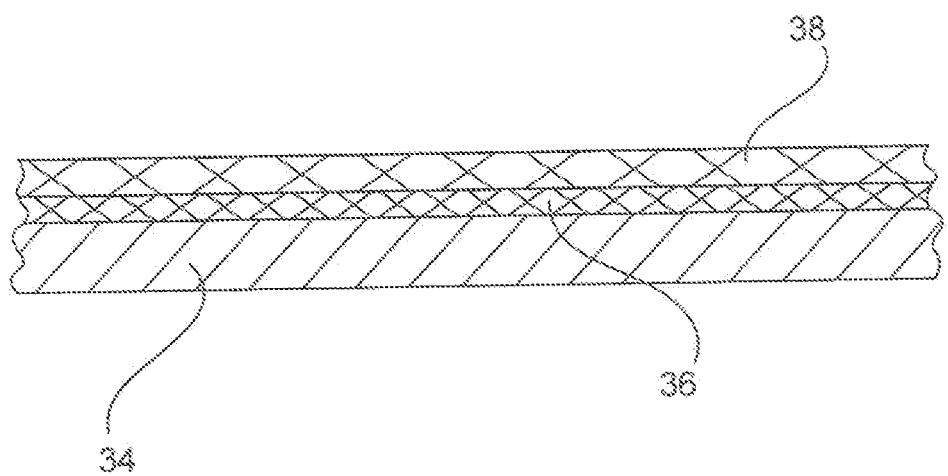
FIG. 4 shows the individual coatings of a surface coating.

Finally, FIG. 4 shows a resulting design of an outer skin of the aircraft 2, with a base coating 34 that is responsible for the mechanical stability of the aircraft, a functional coating 36 in place on the aforesaid, and an adjacent film 38 that has been formed from a shrink-on film material. As a result of the closed surface of the film material 38 a very good sealing effect is achieved so that excellent corrosion resistance is provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for coating a surface of an aircraft, comprising the steps of:
    cutting to size at least one film section from a shrinkable film material in such a manner that the film section relative to a surface section of the aircraft, which surface section is to be coated with the film section, comprises an overmeasure that is determined by the degree of shrinkage of the film material;
    applying the at least one film section and a functional coating to the surface section so that the functional coating is arranged between the surface section and the at least one film section; and
    shrinking the at least one film section by heating it to a temperature that corresponds at least to the shrinkage temperature of the at least one film section and at least to the flow temperature of the functional coating until the contours of the at least one film section conform to the contours of the surface section;
    wherein the at least one film section comprises a tubular or a hood-type design, at least in one section, and applying the at least one film section involves placing the at least one tubular or hood-type region of the at least one film section on at least one projecting component of the aircraft.

2. The method of claim 1, wherein cutting to size involves cutting a contour from a sheet-like film material.

3. The method of claim 1, wherein cutting to size involves connecting at least two edges of the film material for closing the circumference of the at least one film section to be cut to size along at least one line of extension.

4. The method of claim 1, wherein cutting to size involves cutting a contour from an at least in some regions tubular film material.

5. The method of claim 1, wherein cutting to size involves connecting several planar or spatially-shaped film subsections.

6. The method of claim 1, wherein the heating involves the local heating of a surface of the at least one film section.

7. The method of claim 1,
    wherein the at least one film section comprises a decal, and applying the film section involves placement of the decal on the surface section to be coated, and
    wherein the heating starts in a region of the at least one film section, which region comprises the decal.

8. The method of claim 1, wherein the heating involves the uniform heating of the entire at least one film section.

9. The method of claim 1, wherein applying the at least one film section involves overlapping, at least in some regions, a second film section shrunk onto the surface section.

10. The method of claim 9, wherein applying the at least one film section involves the complete overlapping of the second film section shrunk onto the surface section.

11. The method of claim 1,
    wherein the at least one projecting component of the aircraft is selected from a group of components, comprising:
    vertical stabilizer unit,
    horizontal stabilizer units,
    wings,
    control surfaces,
    engine pylons,
    engine shrouds, and
    fairings.

\* \* \* \* \*